United States Patent
Takahashi et al.

(10) Patent No.: US 7,812,875 B2
(45) Date of Patent: Oct. 12, 2010

(54) SOLID-STATE IMAGING DEVICE

(75) Inventors: Kenji Takahashi, Shiga (JP); Yoshimitsu Sasaki, Kanagawa (JP); Toshiyuki Nakashima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/468,387

(22) Filed: May 19, 2009

(65) Prior Publication Data

US 2009/0225197 A1     Sep. 10, 2009

Related U.S. Application Data

(62) Division of application No. 11/409,209, filed on Apr. 24, 2006, now abandoned.

(30) Foreign Application Priority Data

Apr. 27, 2005    (JP)    ............................ 2005-129405

(51) Int. Cl.
*H04N 3/14* (2006.01)
*H04N 5/262* (2006.01)

(52) U.S. Cl. .................... 348/296; 348/240.2; 348/298; 348/308; 348/311

(58) Field of Classification Search ......... 348/302–304, 348/296, 298, 308, 311, 312, 317, 240.2
See application file for complete search history.

(56) References Cited

U.S. PATENT DOCUMENTS

| | | | | |
|---|---|---|---|---|
| 6,507,365 B1 * | 1/2003 | Nakamura et al. | ........... | 348/296 |
| 6,801,250 B1 * | 10/2004 | Miyashita | ................ | 348/220.1 |
| 6,999,120 B1 * | 2/2006 | Egawa et al. | ................ | 348/296 |
| 7,336,303 B2 * | 2/2008 | Shimomura et al. | ...... | 348/240.2 |
| 7,355,643 B2 * | 4/2008 | Shimomura et al. | ......... | 348/294 |
| 7,388,607 B2 * | 6/2008 | Nakahira | .................. | 348/240.2 |
| 2004/0095485 A1 | 5/2004 | Ueda et al. | | |
| 2005/0057673 A1 | 3/2005 | Shimomura et al. | | |
| 2007/0098386 A1 * | 5/2007 | Yoneda et al. | ................. | 396/60 |
| 2008/0002038 A1 * | 1/2008 | Suwa | ....................... | 348/229.1 |

FOREIGN PATENT DOCUMENTS

| | | |
|---|---|---|
| JP | 09-046600 | 2/1997 |
| JP | 2004-072278 A | 3/2004 |
| JP | 2005-094142 A | 4/2005 |

OTHER PUBLICATIONS

Japanese Office Action issued in Japanese Patent Application No. JP 2005-129405 dated Jun. 29, 2010.

* cited by examiner

*Primary Examiner*—Tuan Ho
*Assistant Examiner*—Marly Camargo
(74) *Attorney, Agent, or Firm*—McDermott Will & Emery LLP

(57) ABSTRACT

The signal processing circuit of the present invention comprises a drive unit and a processing unit for picture signal. The drive unit supplies each of the shift pulses separately to the electronic shutter shift register and the readout shift register. The processing unit for picture signal designates a control start position of a digital picture signal outputted from an A/D converter and performs interpolation processing thereon along the horizontal direction and the vertical direction. The drive unit adjusts cycles of each of the shift pulses for controlling a vertical-line readout rate of the solid-state imaging device, and then intermittently reads out the analog picture signal from the solid-state imaging device. The processing unit for picture signal performs vertical-line interpolation processing in accordance with the vertical-line readout rate for extending a part of picture area of the digital picture signal.

5 Claims, 10 Drawing Sheets

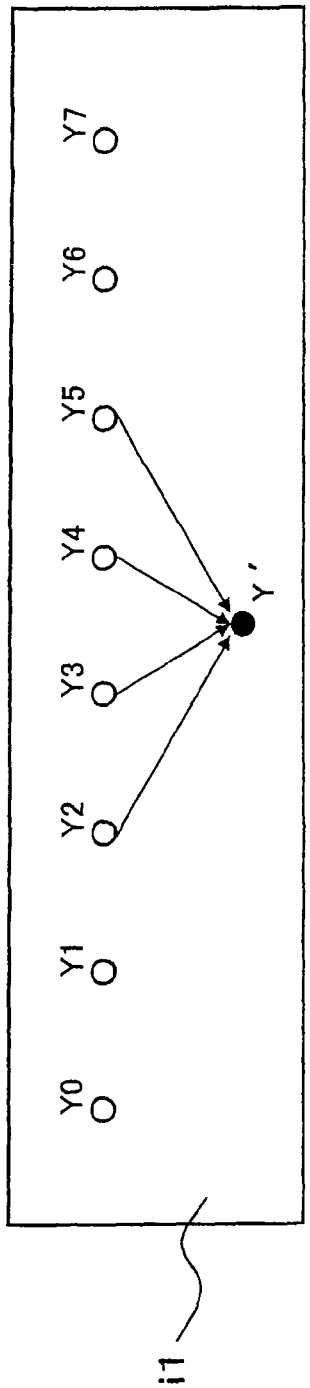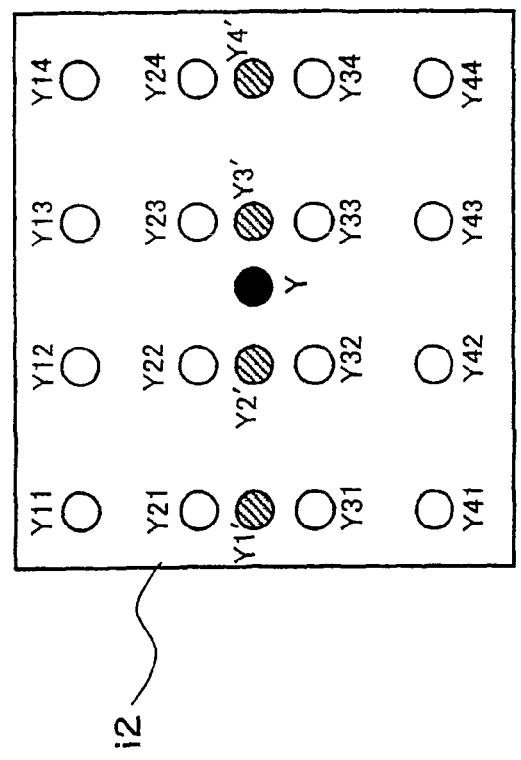

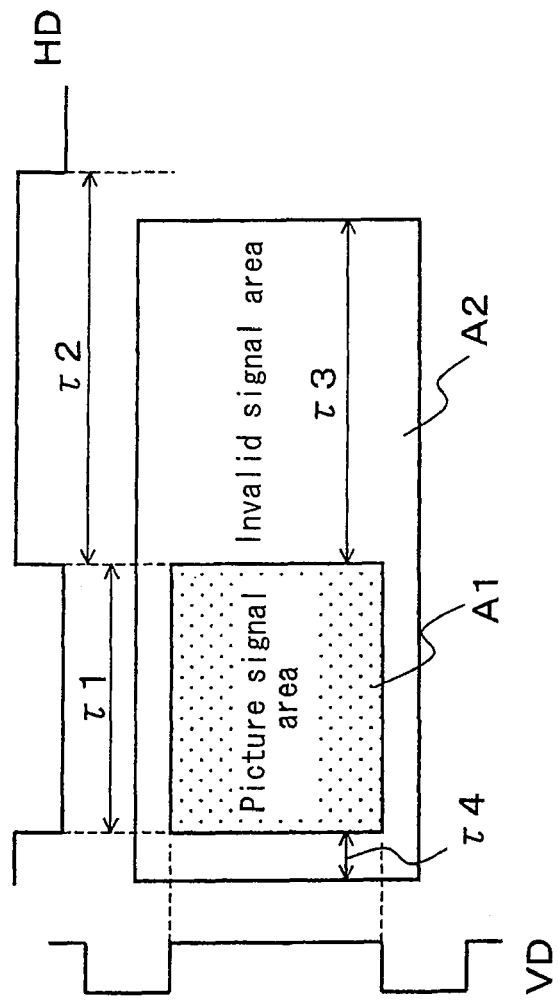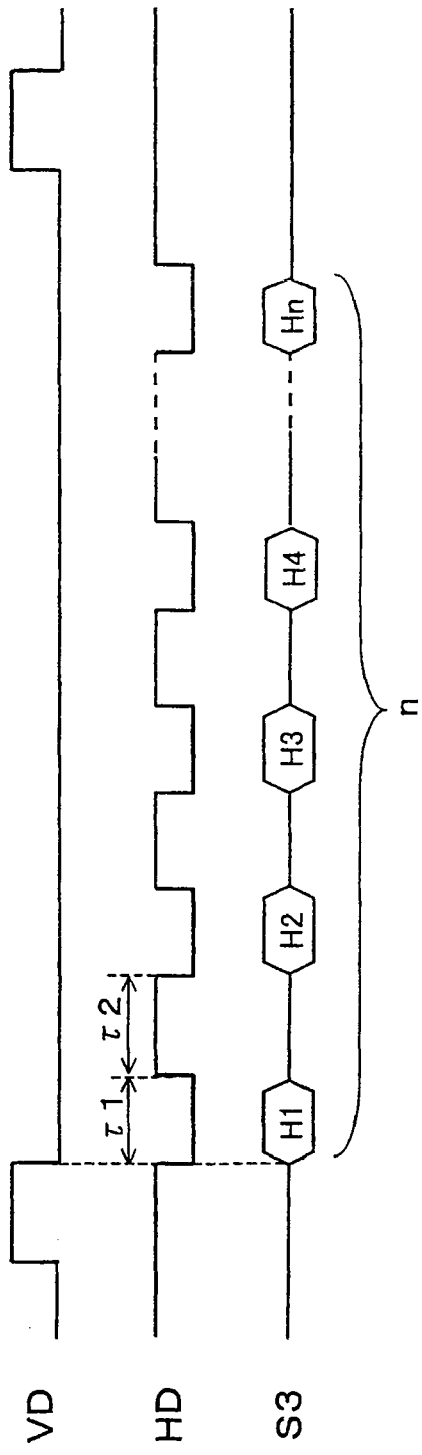

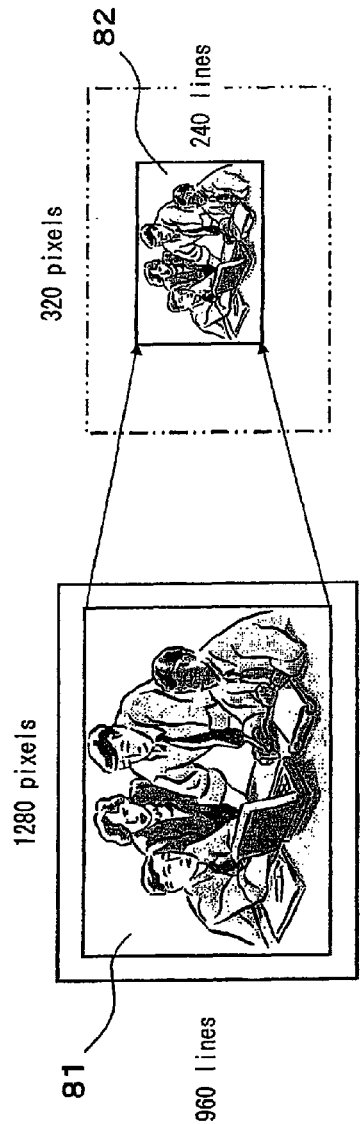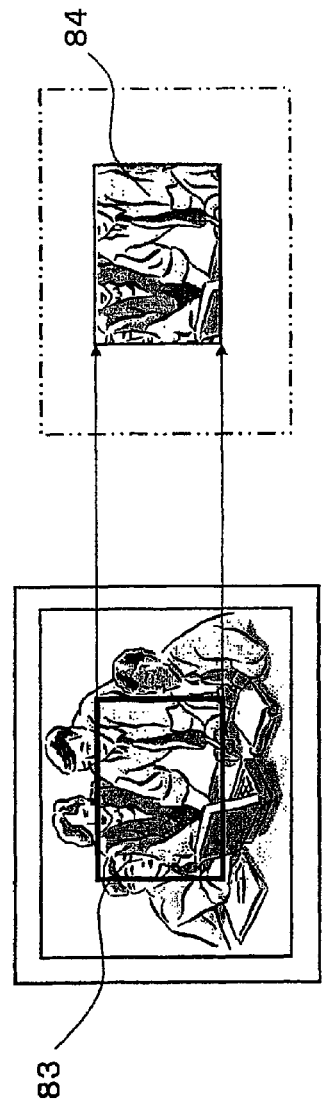
FIG. 9A PRIOR ART
FIG. 9B PRIOR ART

SOLID-STATE IMAGING DEVICE

This application is a divisional of U.S. application Ser. No. 11/409,209, filed Apr. 24, 2006, now abandoned which claims priority to Japanese Patent Application No. 2005-129405, filed Apr. 27, 2005, the entire contents of each of which are incorporated herein by reference.

BACKGROUND OF THE INVENTION

1. Field of the Invention

The present invention relates to a signal processing circuit for a solid-state imaging device of a portable telephone with a built-in camera, a digital still camera, etc., and to a solid-state imaging device.

2. Description of the Related Art

Imaging devices such as a portable telephone, digital still camera and the like have an enlargement zoom mechanism mounted thereon as an essential function of the camera. As the enlargement zoom functions, there are an optical enlargement zoom function that zooms in and out by controlling a lens, and an electronic enlargement zoom mechanism that zooms by interpolation of digital data. The optical enlargement zoom mechanism tends to be large-scaled since it requires mechanisms such as a zoom lens and a motor to drive the zoom lens. Therefore, an electronic enlargement zoom mechanism of a smaller-scale is frequently used for a small-size imaging device such as a portable camera.

A picture image captured by the electronic enlargement mechanism will be described by referring to FIG. 9 and FIG. 10. First, there will be described the case where electronic enlargement zoom is performed without using a frame memory. As shown in FIG. 9A, let us look into the case where: an output picture area 82 is smaller than a picked-up area 81 captured by the solid-state imaging device. For example, when an image of QVGA (320 pixels×240 lines) output image size is outputted by the solid-state imaging device having the picked-up picture area of 1,280 pixels×960 lines, the picked-up picture is reduced by one fourth to obtain the one-times (unmagnified) output picture (¼×4=1). Accordingly, an output picture of four third magnification can be obtained with a reduction rate of one third, and the output picture of twice the size can be obtained with the reduction rate of one half. Enlargement zoom can be achieved in this way. As shown in FIG. 9B, the maximum enlargement rate is the four times (⅕ reduction rate), which corresponds to the case where a subject area 83 picked up by the solid-state imaging device is cut out in an output picture size of QVGA (picked-up output area 84 of the output picture).

However, it is not possible with this configuration to perform enlargement zoom when the size of the picked-up area 91 and that of the picked-up picture output area 92 are equal as shown in FIG. 10A. In such a case, as shown in FIG. 10B, enlargement zoom can be achieved by storing the picked-up data of a part of a subject area 93 in one scene to a frame memory and carrying out electronic interpolation (output picture area 94). However, the frame memory is required additionally in such a case.

As described above, there is additionally required the frame memory for performing the electronic enlargement zoom when the ratio between the picked-up size and the output size (output size/picked-up size) is 1 or more. Particularly in the case of a small-size portable apparatus, it is essential to downsize the camera module and keep the low-cost. Thus, it is not practical to mount the frame memory.

In addition to a CCD sensor, there is also an MOS-type sensor as the imaging sensor. The MOS-type sensor is characterized by a low power consumption, a single power drive, etc., and used frequently for a small-size portable apparatus such as a portable telephone with a built-in camera. However, like the CCD, the MOS-type sensor faces the above-described problems.

SUMMARY OF THE INVENTION

The main object of the present invention therefore is to provide an imaging sensor capable of the electronic enlargement zoom without a frame memory even under a condition where the ratio between the picked-up size and the output size (output size/picked-up size) is 1 or more, and to provide a driving method thereof.

In order to achieve the aforementioned object, a signal processing circuit of the present invention is consisted of signal-processing an analog picture signal outputted from a solid-state imaging device that comprises: a pixel part arranged two-dimensionally; an electronic shutter shift register that supplies an electronic shutter shift pulse to a pixel part for resetting an electric charge of the pixel part; and a readout shift register that supplies a vertical readout shift pulse to the pixel part for reading out the electric charge of the pixel part in order, wherein the signal processing circuit comprises a drive unit, an A/D converter, a processing unit for picture signal, and a control unit, wherein:

the drive unit supplies each of the shift pulses separately to the electronic shutter shift register and the readout shift register; the A/D converter converts the analog picture signal outputted from the solid-state imaging device to a digital picture signal; the processing unit for picture signal designates a control start position of the digital picture signal outputted from the A/D converter and performs interpolation processing thereon along a horizontal direction and a vertical direction; the control unit controls the drive unit and the processing unit for picture signal; the drive unit adjusts cycles of each of the shift pulses to control a vertical-line readout rate of the solid-state imaging device, and then intermittently reads out the analog picture signal from the solid-state imaging device; and the processing unit for picture signal performs vertical-line interpolation processing in accordance with the vertical-line readout rate to extend a part of picture area of the digital picture signal.

With this configuration, it is possible to achieve the electronic enlargement zoom even without a frame memory under a condition where the output size to the picked-up size is one or more times.

Further, a signal processing circuit of the present invention is the one to do signal-processing of an analog picture signal outputted from a solid-state imaging device that comprises: a pixel part arranged two-dimensionally; an electronic shutter shift register that supplies an electronic shutter shift pulse to a pixel part in order to reset an electric charge of the pixel part; and a readout shift register that supplies a vertical readout shift pulse to the pixel part to read out the electric charge of the pixel part in order. The signal processing unit comprises a drive unit, an A/D converter, a processing unit for picture signal, and a control unit, wherein: the drive unit supplies each of the shift pulses separately to the shift register for the electronic shutter and the read shift register; the A/D converter converts the analog picture signal outputted from the solid-state imaging device to a digital picture signal; the processing unit for picture signal designates a control start position of the digital picture signal outputted from the A/D converter, and performs interpolation processing thereon along a horizontal direction and a vertical direction; the control unit controls the drive unit and the processing unit for picture signal; the drive unit extends a horizontal blanking period of the solid-state imaging device to be longer than a valid period in one line of the analog picture signal; and the processing unit for picture signal performs vertical-line interpolation processing to extend a part of picture area of the digital picture signal.

According to this construction, it is possible to achieve the electronic enlargement zoom even without a frame memory and, moreover, without performing high-rate transfer and intermittent readout by the solid-state imaging device under a condition where the output size to the picked-up size is one or more times.

In the above-described construction, it is preferable that the drive unit controls the vertical-line readout rate of the solid-state imaging device in accordance with a zoom magnification, and the processing unit for picture signal adjusts the horizontal blanking period of the digital picture signal outputted from the processing unit for picture signal such that periodicity of a synchronizing signal of the digital picture signal outputted from the processing unit for picture signal becomes constant regardless of the zoom magnification.

According to this, the synchronizing signal of the digital picture signal outputted from the processing unit for picture signal can be provided with a uniform periodicity regardless of the zoom magnifications and without intermittence. Therefore, the interface between the digital picture signal and the circuit or the device to be connected thereto can be simplified.

The construction of the above signal processing circuit can be applied to a solid-state imaging device. In the above construction, the pixel part is preferable to be constituted with a MOS-type sensor consisted of a focal plane shutter system.

The present invention enables the electronic enlargement zoom even without a frame memory under a condition where the output size to the picked-up size is one or more times.

The present invention can be utilized in the solid-state imaging devices such as digital still cameras. Particularly, it can be applied to a portable telephone with a built-in camera, on which an optical zoom is hard to mount.

BRIEF DESCRIPTION OF THE DRAWINGS

Other objects of the present invention will become clear from the following description of the preferred embodiments and the appended claims. Those skilled in the art will appreciate that there are many other advantages of the present invention that have been mentioned in the specification by carrying out the present invention.

FIG. 6A is a illustration for describing the first action of interpolation performed by a processing unit for picture signal according to the first embodiment of the present invention;

FIG. 6B is a illustration for describing the second action of interpolation performed by the processing unit for picture signal according to the first embodiment of the present invention;

FIG. 7A is an illustration of a pixel structure in the state where a blanking period is extended in the solid-state imaging device according to the second embodiment of the present invention;

FIG. 7B is an illustration for describing a synchronizing signal of the solid-state imaging device according to the second embodiment of the present invention;

FIG. 9A is an illustration of a first picture image of the electronic enlargement zoom of a conventional case where a frame memory is not used;

FIG. 9B is an illustration of a second picture image of the electronic enlargement zoom of a conventional case where a frame memory is not used;

DETAILED DESCRIPTION OF THE INVENTION

In the followings, description is given to the embodiments of a solid-state imaging device and a signal processing circuit for a solid-state imaging device according to the present invention by referring to the accompanying drawings.

First Embodiment

Figure 1:
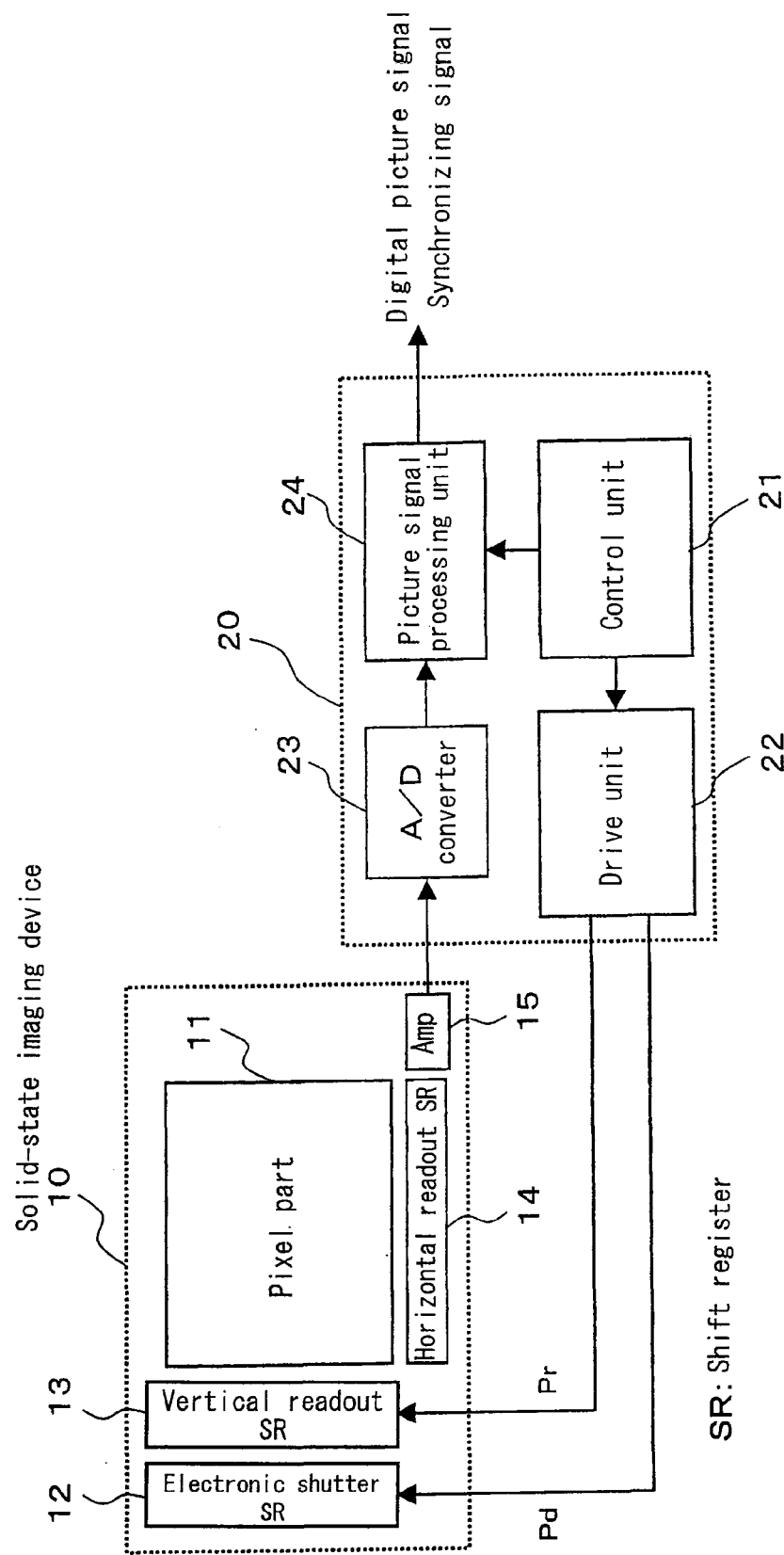
FIG. 1 is a block diagram for showing the structure of a solid-state imaging device according to the first to third embodiments of the present invention.

FIG. 1 is a block diagram for showing the structure of a solid-state imaging device according to a first embodiment of the present invention. The solid-state imaging device comprises a solid-state imaging device 10 and a signal processing circuit 20. The signal processing circuit 20 comprises a control unit 21, a drive unit 22, an A/D converter 23, and a processing unit for picture signal 24. The solid-state imaging device 10 comprises: a pixel part 11 arranged two-dimensionally; an electronic shutter shift register 12 for transferring electronic shutter shift pulse Pd in order; a vertical readout shift register 13 to transfer vertical readout shift pulse Pr for reading out an electric charge to the pixel part 11 in order; a horizontal readout shift register 14 to transfer the electric charge read out from the pixel part 11 in order to the horizontal direction; and an output amplifier 15.

Figure 2:
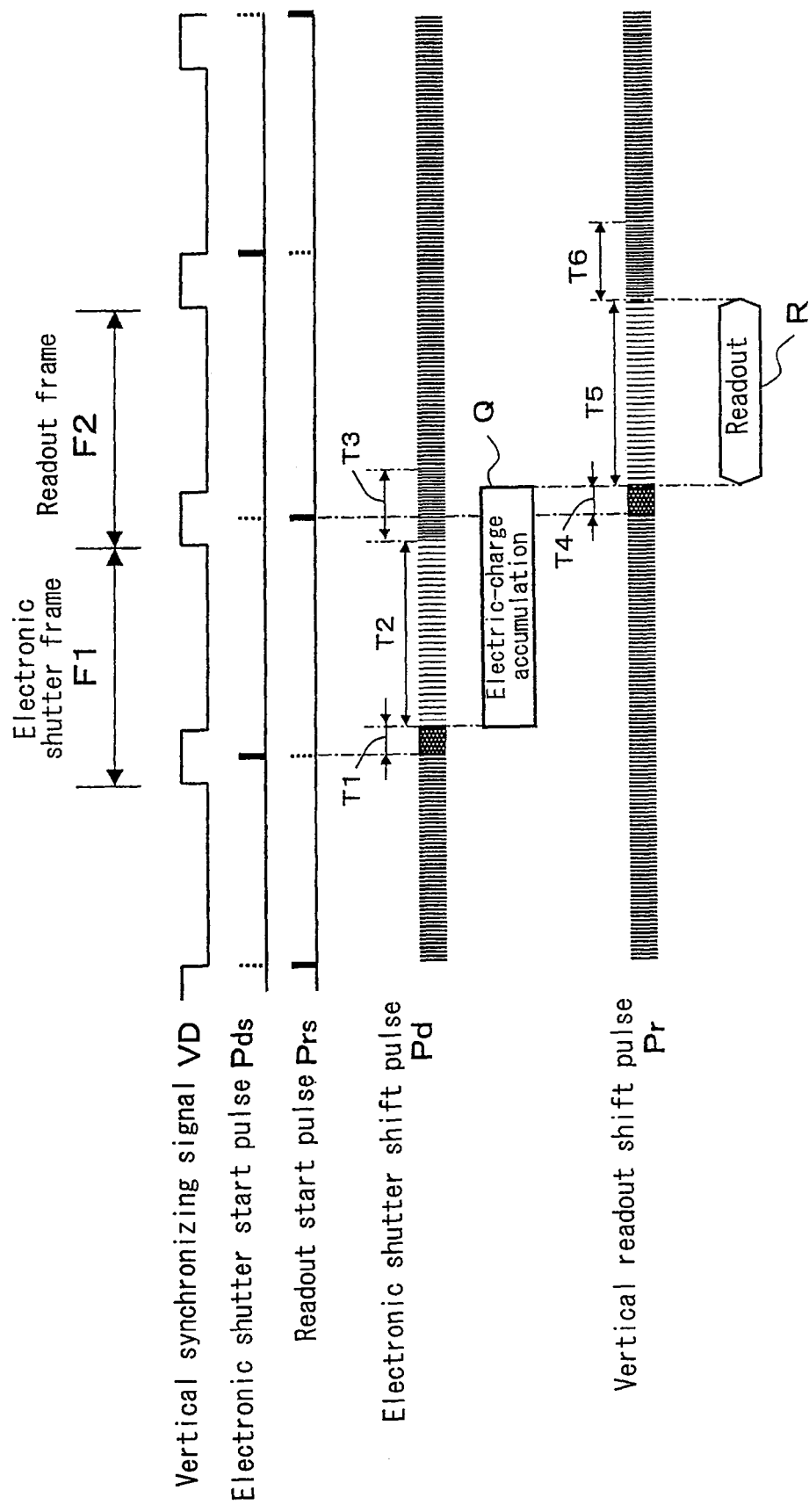
FIG. 2 is a timing chart for showing action of the solid-state imaging device according to the first embodiment of the present invention.

The pixel part 11 is consisted of a random-accessible MOS-type sensor with a focal-plane shutter system. As shown in FIG. 2, both registers 12 and 13 have high-rate transfer pulses Pd and Pr, which are constructed with a shorter pulse than a regular pulse at least in a part of period within one cycle.

The solid-state imaging device takes a frame period consisted of successive electronic-shutter frame period F1 and readout frame period F2 as one cycle. In the electronic shutter frame period F1, the electronic shutter shift pulse Pd is supplied from the drive unit 22 to the electronic shutter register 12 and, in the readout frame period F2, the vertical readout shift register Pr is supplied from the drive unit 22 to the vertical readout shift register 13. Hereby, the processing unit for picture signal 24 achieves the electronic enlargement zoom mechanism in the same frame period.

Next, there will be described the action of the solid-state imaging device according to the embodiment, which is constituted as described above. The control unit 21 controls the drive unit 22 and the processing unit for picture signal 24 while synchronizing one another. The drive unit 22 generates the electronic shutter shift pulse Pd and supplies it to the electronic shutter shift register 12 in the electronic shutter frame period F1. A high-rate transfer pulse is contained in a part of the electronic-shutter shift pulse Pd. The electronic shutter shift register 12 resets the electric charge by supplying the electronic shutter shift pulse Pd to the pixel part 11. Thereby, the electric charges of the optical image of the subject are accumulated from immediately after the reset.

Then, the drive unit 22 generates the readout shift pulse Pr and supplies it to the vertical readout shift register 13 in the readout frame F2. As described above, a high-rate transfer pulse is contained in a part of the readout shift pulse Pr. The readout shift register 13 reads out the accumulated electric charge by supplying the readout shift pulse Pr to the pixel part 11. The electric charge read out from the pixel part 11 in the vertical direction is transferred in the horizontal direction by the horizontal readout shift register 14, which is converted into a voltage signal by the output amplifier 15 and outputted to the A/D converter unit 23 of the signal processing circuit 20 as an analog picture signal. The A/D converter unit 23 converts the inputted analog picture signal to a digital picture signal and outputs it to the processing unit for picture signal 24. The processing unit for picture signal 24 performs format conversion of the inputted digital picture signal as well as processing such as interpolation, and outputs the signal-processed digital picture signal and the synchronizing signal. The synchronizing signal is corresponded to the signal-processed digital picture signal.

In the solid-state imaging device 10 having the structure described above, reading-out rate of the lines is controlled in the vertical direction. The processing unit for picture signal 24 performs line interpolation in the vertical direction in accordance with the line reading-out rate in order to achieve the electronic enlargement zoom mechanism.

FIG. 2 is a timing chart for showing the action of the solid-state imaging device having the structure described above. A period of "L" level in a vertical synchronizing signal VD is a period when picture-signal is valid, and that of an "H" level is a period when picture-signal is invalid (vertical blanking period).

The electric charge is reset as a unit of each line according to an electronic shutter start pulse Pds and the electronic shutter shift pulse Pd. The electronic shutter shift pulse Pd has a high-rate electronic shutter period T1 and an intermittent electronic shutter period T2 in the electronic shutter frame period F1. An electronic shutter period T3 may be under a high rate like the period T1 or may be under a normal rate. "Q" is an electric charge accumulation period.

The electric charge is read out as a unit of each line according to a readout start pulse Prs and the vertical readout shift pulse Pr. The readout shift pulse Pr has a high-rate readout period T4 and an intermittent readout period T5 in the readout frame period F2. "R" is a readout period.

Figure 3:
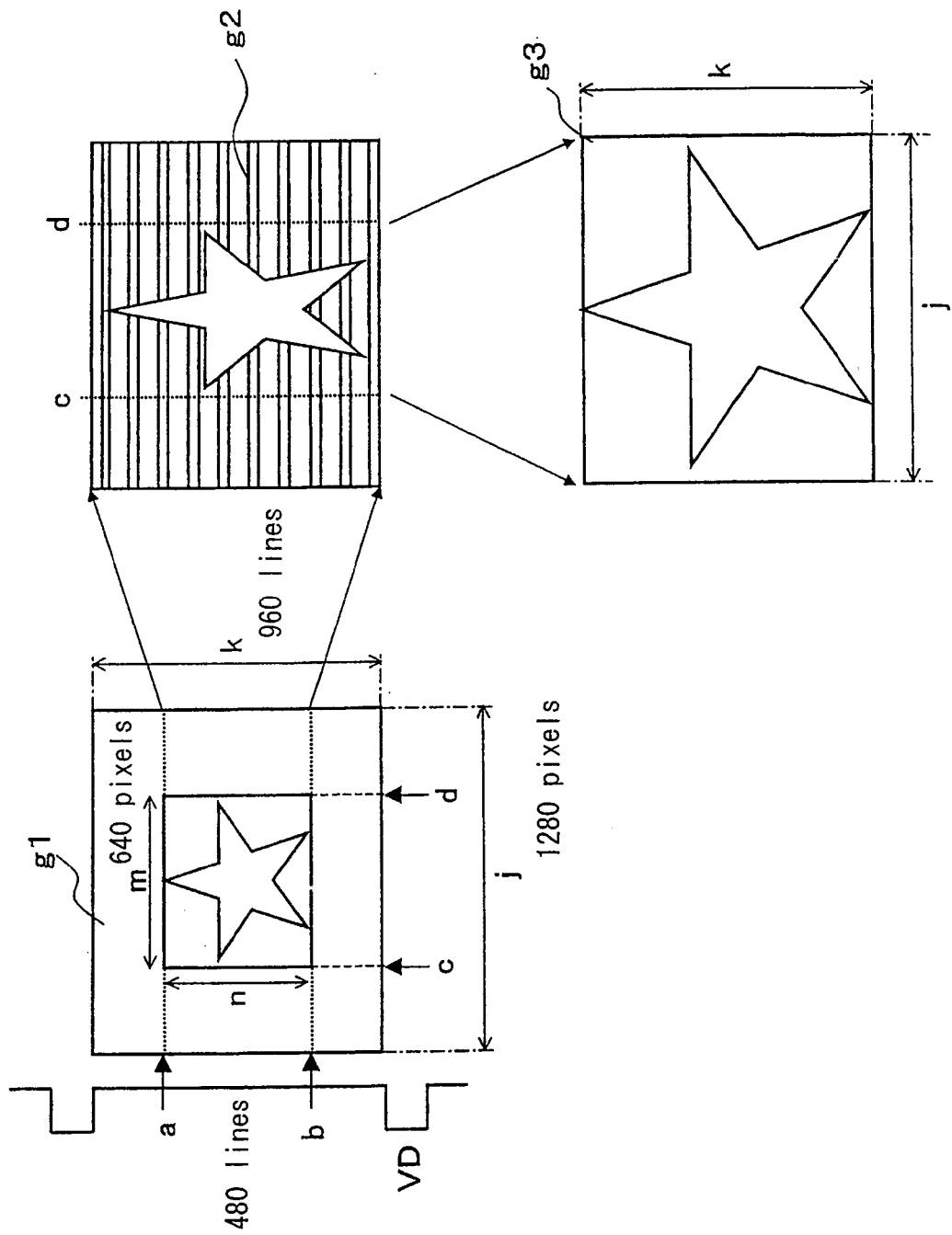
FIG. 3 is an illustration for describing the electronic enlargement zoom action of the solid-state imaging device according to the first embodiment of the present invention.

In the followings, a method to achieve the electronic enlargement zoom in the embodiment will be described specifically by referring to FIG. 3-FIG. 6. FIG. 3 shows image illustrations of picture configurations from inputting of the digital picture signal from the A/D converter 23 to the processing unit for picture signal 24 until outputting. Reference numeral g1 is an image illustration of the picture configuration in the solid-state imaging device 10, g2 is an image illustration of the picture configuration when reading out is carried out intermittently in the vertical direction, and g3 is an image illustration of the picture configuration when pixel-interpolation is performed in the horizontal direction.

In the picture configuration g1 (j×k) containing a desired picture of m×n pixels in the solid-state imaging device 10 (m<j, n<k), the electric charge is transferred at a high rate until the readout start position a in the vertical direction of the j×n pixels in the high-rate readout period T4, while the electric charge is transferred at a slower rate than a normal rate between the start position a of the prescribed picture and the end position b. Then, the A/D-converted picture signal (referred to as a digital picture signal hereinafter) is sent out to the processing unit for picture signal 24. After the end position b in the vertical direction, the electric charge is transferred again at a high rate or at a normal rate.

The processing unit for picture signal 24 performs signal interpolation between the lines to the digital picture signal supplied from the solid-state imaging device 10 (it is read out intermittently in the vertical direction). The picture configuration g2 shows the picture image of the digital signal to which the signal interpolation is performed. Further, the processing unit for picture signal 24 performs the other signal interpolation processing simultaneously with the above-described interpolation signal processing. In this other signal interpolation processing, a start position c of a desired picture is designated in the horizontal direction. Then, the area of m-pixels is extended in a region until reaching the area of j-pixels in the horizontal direction. The picture configuration g3 shows the picture image of the digital picture signal where interpolation processing are performed to both signals. By performing interpolation processing to both signals, the picture region of m×n is zoomed by electronic enlargement to the picture region of j×k.

Figure 4:
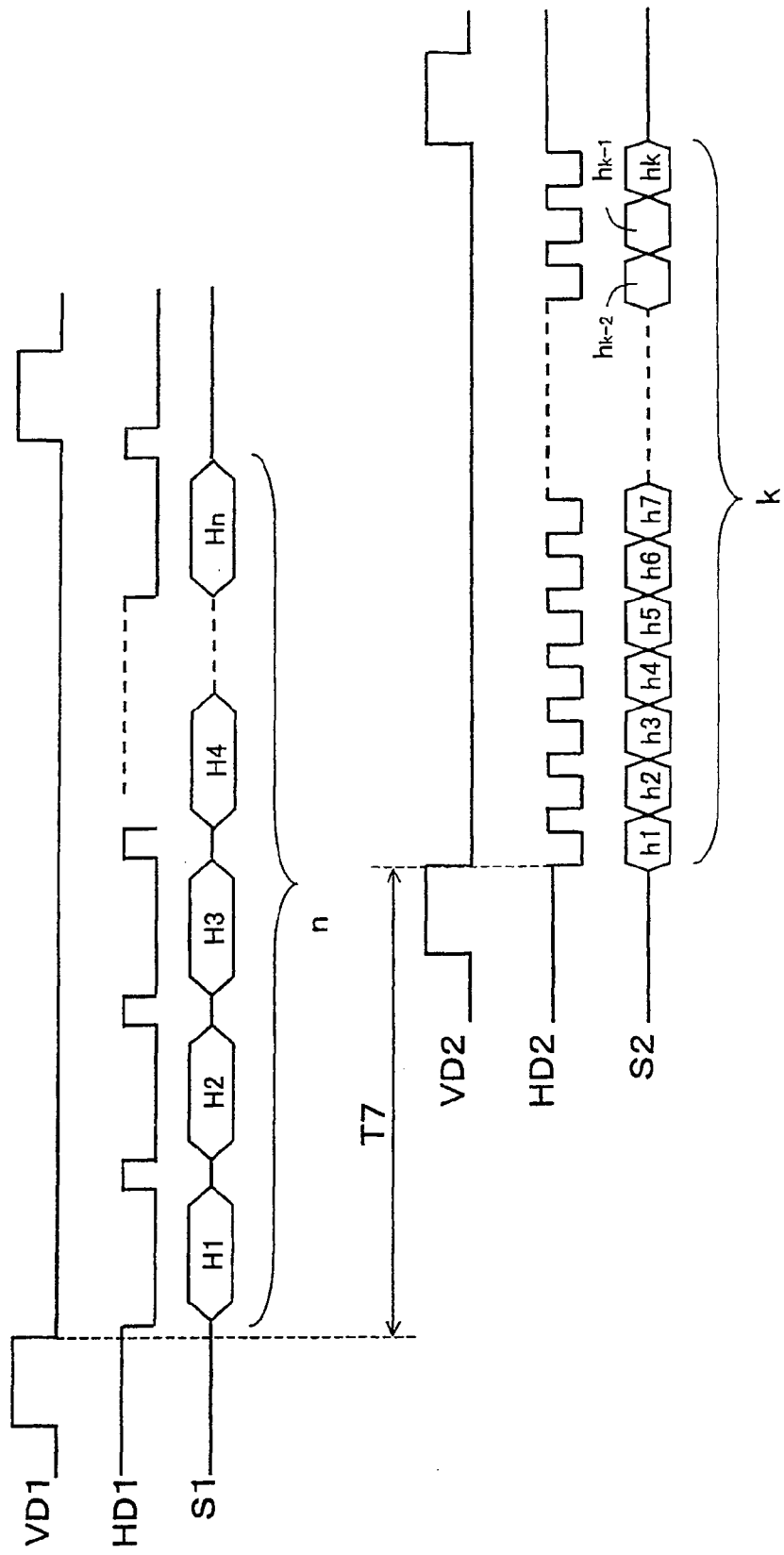
FIG. 4 is a vertical timing chart for showing the action of the solid-state imaging device according to the first embodiment of the present invention.

The action mentioned above will be described in more detail by referring to FIG. 4 and FIG. 5. In FIG. 4, the digital picture signal inputted to the signal processing circuit 20 and the digital picture signal outputted from the signal processing circuit 20 are shown by the vertical rate as a standard. In a period of one cycle of the input vertical synchronizing signal VD1, the digital picture signal S1 including in the n-lines from H1 to Hn being read out intermittently is inputted to the processing unit for picture signal 24 under synchronizing with the input horizontal synchronizing signal HD1. The processing unit for picture signal 24 performs interpolation processing on the inputted digital picture signal S1 including in the n-lines to generate and output a digital picture signal S2 including in the k-lines from h1 to hk. Reference numeral T7 is a delay amount in the vertical direction from the input of the picture signal S1 until the output of the picture signal S2.

Figure 5:
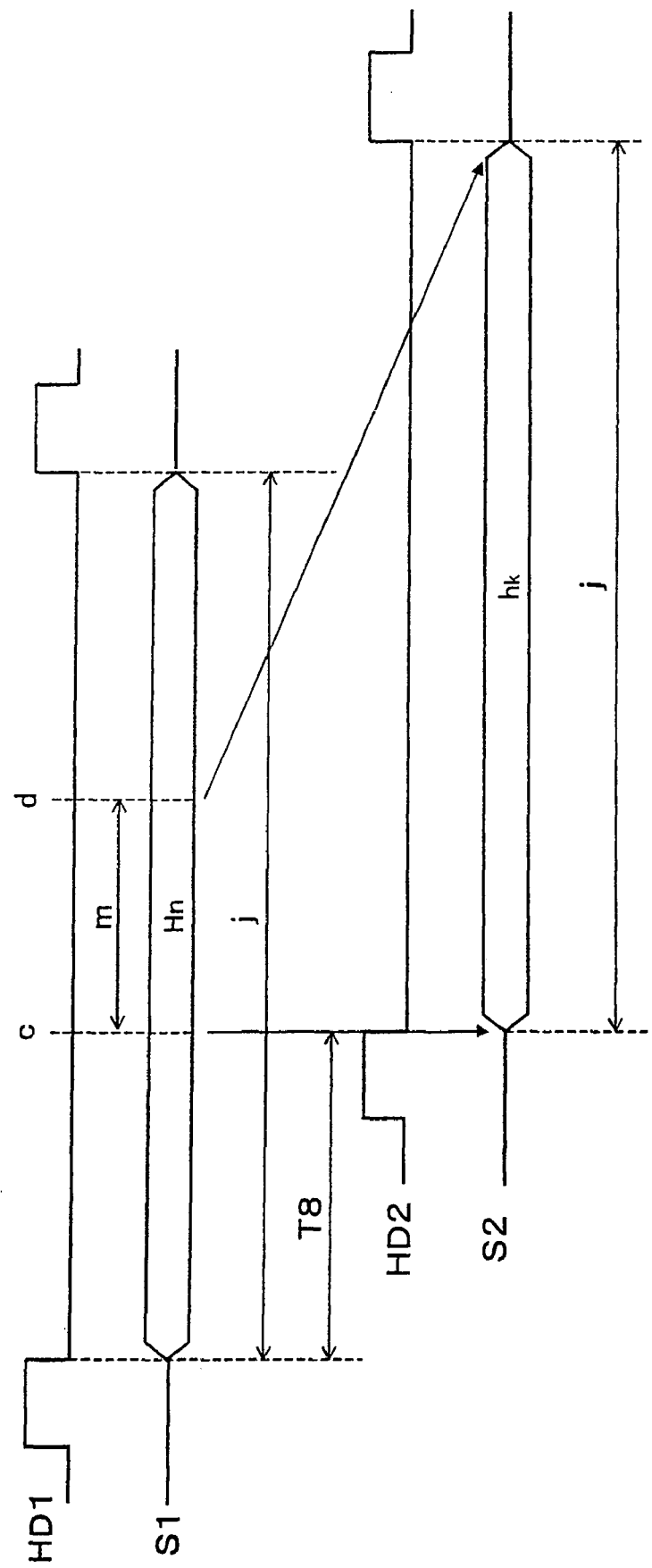
FIG. 5 is a horizontal timing chart for showing the action of the solid-state imaging device according to the first embodiment of the present invention.

In FIG. 5, the digital picture signal inputted to the signal processing circuit 20 and the digital picture signal outputted from the signal processing circuit 20 are shown by the horizontal rate as a standard. The digital picture signal S1 is inputted to the processing unit for picture signal 24 under synchronizing with the input horizontal synchronizing signal HD1. The processing unit for picture signal 24 performs signal interpolation to the region including m-pixels within the range between c and d to the area of j-pixels (m<j) to generate the digital signal S2. Reference numeral T8 is a delay amount in the horizontal direction.

FIG. 6A and FIG. 6B show the interpolation processing performed in the processing unit for picture signal 24. The interpolation processing is described herein by a cubic interpolation method that uses a cubic function. FIG. 6A shows one-dimensional image i1 in the horizontal direction or vertical direction.

Based on an interpolation expression (1), $$Y'=F(Y2,Y3,Y4,Y5,K) \quad (1)$$

data of one pixel is interpolated from four pixels.

In the expression, Y' is the pixel data of the interpolation pixel, F is the interpolation function, Y2 is the pixel data of the interpolation start pixel, Y2-Y5 are pixel data of respective pixels, and K is the interpolation coefficient, respectively.

FIG. 6B shows two-dimensional image i2 of 4×4 pixels. First, the interpolation pixel data Y1' can be obtained by substituting pixel data of four pixels in the vertical direction, Y11,Y21,Y31,Y41 to the interpolation expression (1). In the same manner, the interpolation pixel data Y2', Y3', and Y4' can be obtained. Then, by substituting the generated interpolation pixel data Y1', Y2', Y3', and Y4' to the interpolation expression (1), the final picture data Y can be obtained. By performing such interpolation processing, the interpolation pixel data of one pixel is generated from the pixel data of 4×4 pixels.

In the followings, the interpolation processing according to the embodiment will be described specifically. For example, it is tried to achieve an electronic enlargement zoom of twice the size under the assumption that the pick-up size of the solid-state imaging device 10 is 1,280 pixels×960 lines and the output picture size is 1,280 pixels×960 lines. In this case, the picture configuration g1 of FIG. 3 has j=1,280 pixels, and k=960 lines. The desired picture composes of a=240$^{th}$ line, b=720$^{th}$ line, n=480 lines, c=320$^{th}$ pixel, d=960$^{th}$ pixel, and m=640 pixels.

The control unit 21 sets the drive unit 22 in the electronic shutter frame period F1 such that the electronic shutter shift pulses Pd of the high-rate electronic shutter period T1=240 lines and of the intermittent electronic shutter period T2=480 lines operate by the intermittent cycles of two lines. In general, intermittent cycle of N-lines means the blank of (1−(1/N))×100 lines in the digital picture signal including one-hundred lines. When N=2, there is a blank of 50 lines out of 100 lines.

Then, the control unit 21 sets the drive unit 22 in the readout frame period F2 such that the vertical readout shift pulses Pr of the high-rate readout period T4=240 lines and of the intermittent readout period T5=480 lines operate by the intermittent cycles of two lines. In the readout frame F2, the digital picture signal of 480 lines is inputted to the processing unit for picture signal 24 from the solid-state imaging device 10. At this time, the digital picture signal is inputted under intermittent state of two lines to the processing unit for picture signal 24.

The processing unit for picture signal 24 generates twice the lines by interpolating between the lines of 480 lines one by one line under two-line intermittent cycle according to the control of the control unit 21. Therefore, the processing unit for picture signal 24 outputs the digital picture signal of k=960 lines in the vertical direction.

Furthermore, the processing unit for picture signal 24 perform interpolation processing according to the control of the control unit 21 in such a manner that the picture size along the horizontal direction is changed from an input size of m=640 to the output size of j=1,280.

According to the above, the electronic enlargement zoom of twice the size can be achieved. The interpolation processing has been described by referring to the cubic interpolation method using a cubic function, however, other interpolation processing such as a linear or quadratic interpolation method may be used as well.

By the embodiment of the invention, it is possible to achieve the electronic enlargement zoom without using a frame memory even under the condition where the output ratio (output size/picked-up size) is 1 or more, by performing at a combination of the accumulation/readout control of the electric charge by the solid-state imaging device 10 through the drive unit 22 and the interpolation processing by the processing unit for picture signal 24.

Second Embodiment

A second embodiment of the present invention achieves electronic enlargement zoom without performing the high-rate transfer and intermittent readout in the solid-state imaging device 10. The embodiment therefore is characterized by that the blanking period of the horizontal synchronizing signal (referred to as a horizontal blanking period hereinafter) is extended to be more than the valid period of the picture signal by the drive unit 22. The fundamental structure of the solid-state imaging device according to this embodiment is the same as that of the first embodiment shown in FIG. 1.

In the embodiment, as shown in the picture configuration of FIG. 7A, horizontal blanking period τ2 corresponding to "H" level of the horizontal synchronizing signal HD is extended to be more than picture signal valid period τ1. As a result, there appears an invalid signal area A2 in the periphery of the picture signal area A1. The horizontal line continues to the horizontal line of the next line, so that the horizontal blanking period becomes the period τ2 of the invalid signal area A2, i.e. a period τ3+a period τ4.

FIG. 7B is a horizontal timing chart of this embodiment. The horizontal synchronizing signal HD repeats the same cycle at all times. That is, the high-rate transfer and the intermittent readout like the case of the first embodiment become unnecessary. In a picture signal S3 of this embodiment, the horizontal blanking period τ2 is more than the picture signal valid period τ1 (τ1<τ2). When collating the picture signal S3 of the embodiment with the picture signal S1 of the first embodiment, it can be seen that the second embodiment enables the same effect as that of performing intermittent readout by two-line cycle even though there is no high-rate transfer and intermittent readout performed by the solid-state imaging device 10. Therefore, the electronic enlargement zoom can be achieved without a frame memory.

In the embodiment, when the horizontal blanking period τ2 is extended to M-times or more (M≧1) of the picture signal valid period τ1, it gives the same effect as that of performing the intermittent readout by the cycle of (M+1) lines. In other words, it is possible to achieve the electronic enlargement zoom of M-times at the maximum.

Furthermore, it is possible to achieve the electronic enlargement zoom of N×(M+1) times at the maximum by combining the configuration to intermittently read out the picture signal by N-line (the constitution of the first embodiment) and the configuration of the second embodiment. In that case, the N-line intermittent readout is performed on the picture signal inputted from the solid-state imaging device 10, and the horizontal blanking period τ2 is extended to the length that is M-times the picture signal valid period τ1. Thereby, the signal output time becomes N×(M+1) times comparing to the signal input time. By utilizing this margin of time, it becomes possible to perform line interpolation without a memory frame.

For example, let us suppose the case where the solid-state imaging device 10 is of 1,280 pixels×960 lines and the output picture size is 1,280 pixels and 960 lines. In the picture configuration g1 shown in FIG. 3, it means to be j=1,280 pixels and k=960 lines. The desired picture size as a result of the zoom is set as one half in size of the desired picture of the first embodiment in the vertical and lateral sizes, respectively, i.e. in the size of n=240 lines and m=320 pixels. By performing the above-described electronic enlargement zoom of four-times to such desired picture, the picture enlarged to 1,280 pixels×960 lines can be obtained.

Considering the combination of the high-rate transfer and the intermittent readout, like the first embodiment, the control unit 21 sets the drive unit 22 such that the electronic shutter shift pulse Pd operates by the intermittent cycle of two-lines in the electronic shutter frame period F1. Then, the control unit 21 sets the drive unit 22 such that the vertical readout shift pulse Pr operates by the intermittent cycle of two-lines in the readout frame period F2. Furthermore, the control unit 21 sets the drive unit 22 such that the horizontal blanking period $\tau 2$ extends to one or more times the picture signal period $\tau 1$ which corresponds to 1,280 pixels.

In the readout frame period F2, the analog picture signal of 240 pixels is inputted under two-line intermittent state to the processing unit for picture signal 24 from the solid-state imaging device 10. In this state, the horizontal blanking period $\tau 2$ is extended to the length of M=1 times the picture signal valid period $\tau 1$. Thus, there is delay period of $2 \times (1+1)=$ 4 times in the signal output time compared to the signal input time. Therefore, interpolation of every three lines can be performed between the lines. The control unit 21 controls the processing unit for picture signal 24 to perform interpolation every three-line between the 240 lines in four-line intermittent cycle to have the lines of four times finally, and the output in the vertical direction becomes k=960 lines.

In the meantime, the control unit 21 controls the processing unit for picture signal 24 to perform interpolation such that the output pixel interval in the horizontal direction becomes one fourth to give the output of 1,280 pixels.

As descried, the embodiment achieves the electronic enlargement zoom of four times by combining the two-line intermittent drive control and control of making the horizontal blanking period to one or more times the picture signal period.

As described above, the embodiment enables the signal output time to have a margin of time compared to the signal input time by extending the horizontal blanking period $\tau 2$ to the length that is one or more times the picture signal valid period $\tau 1$. By performing the line interpolation within the margin of time, it is possible to achieve the electronic enlargement zoom without using a frame memory even under a condition where the output size to the picked-up size is one or more times. Moreover, it is not necessary to perform the high-rate transfer control and the intermittent readout control in the solid-state imaging device to achieve the electronic enlargement zoom. It is possible, however, to achieve the electronic enlargement zoom at much larger magnification in the embodiment by combining the high-rate transfer control and the intermittent readout control.

Third Embodiment

A third embodiment of the present invention allows the synchronizing signal to have the constant cycle regardless of the magnifications (zoom magnifications) in the electronic enlargement zoom. The fundamental structure of the solid-state imaging device according to this embodiment is the same as that of the first embodiment shown in FIG. 1.

Figure 8:
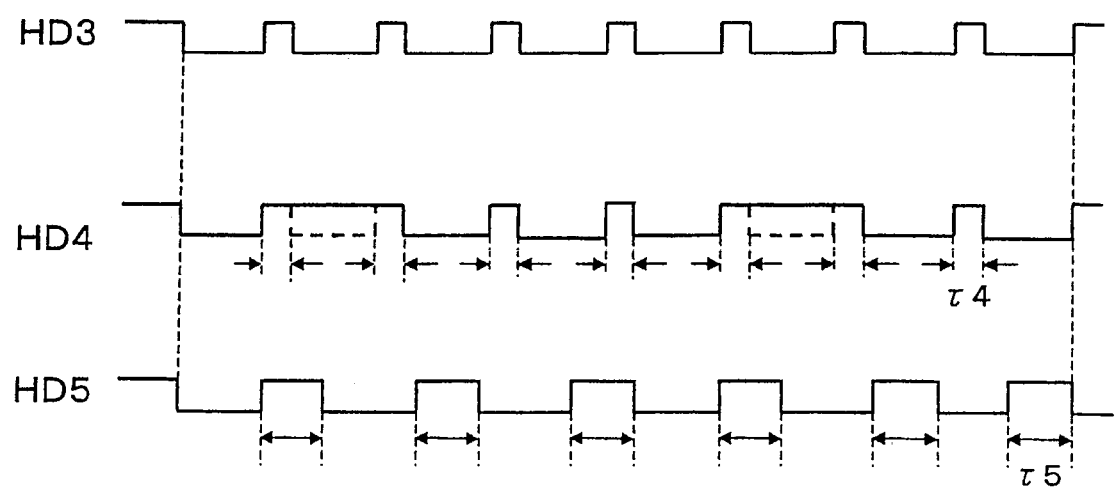
FIG. 8 is a timing chart where the external synchronizing signals are made constant in the solid-state imaging device according to the third embodiment of the present invention.
Figure 10A:
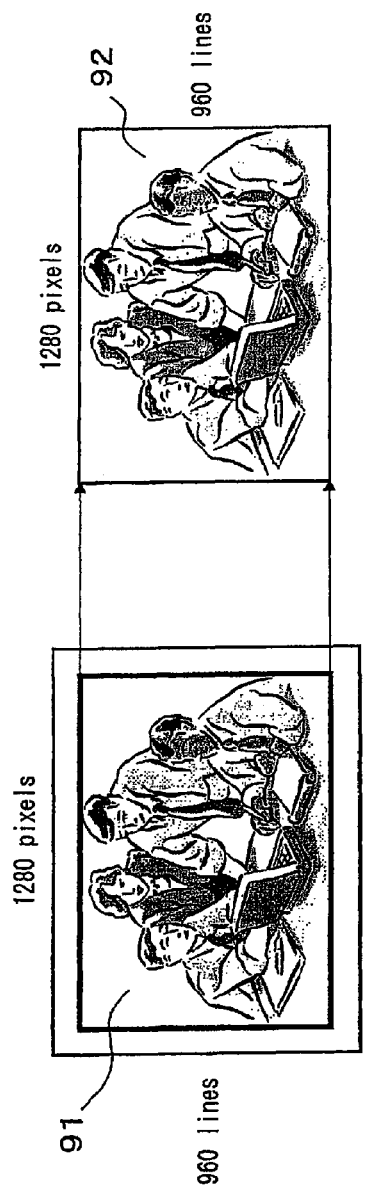
FIG. 10A is an illustration of a first picture image of the electronic enlargement zoom of a conventional case where a frame memory is used.
Figure 10B:
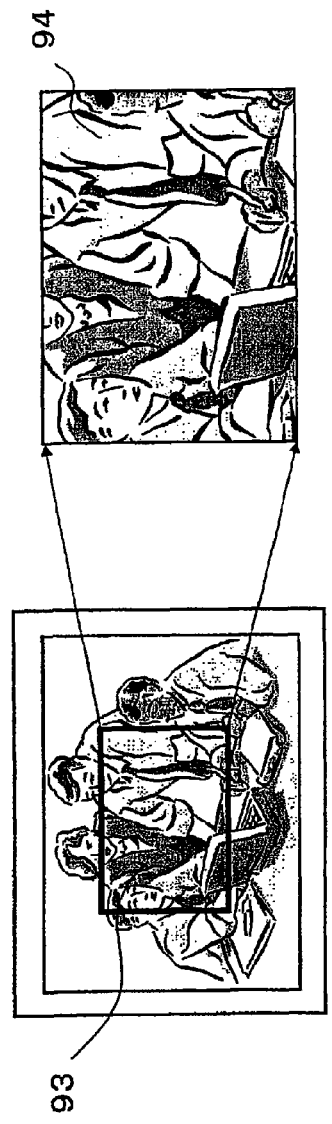
FIG. 10B is an illustration of a second picture image of the electronic enlargement zoom of a conventional case where a frame memory is used.

When the electronic enlargement zoom is achieved by the constitutions of the first and second embodiments without using a frame memory, the occurrence cycle of the line intermittence (referred to as a line intermittence cycle hereinafter) varies in accordance with the zoom magnification. In FIG. 8, reference numeral HD3 is a horizontal synchronizing signal of the picture signal inputted from the solid-state imaging device 10. A horizontal synchronizing signal H4 at the magnification of ¾ times has a periodicity of one valid line, one invalid line, and two valid lines as a unit, however, it becomes in "H", "L", "H", and "H", which has no uniform periodicity when it is seen as the line unit. As a result, there occurs a period where the picture signal is not outputted, thereby it gives difficulty to the interface between the output signal of the solid-state imaging device and the circuit or the device to which the output signal is inputted.

On the contrary, the third embodiment performs the vertical-line readout control of the solid-state imaging device 10 and the interpolation processing of the processing unit for picture signal 24 simultaneously in accordance with the enlargement magnification, and adjusts the length of the horizontal blanking period. Hereby, the synchronizing signal outputted from the processing unit for picture signal 24 can be made constant without having intermittence, regardless of the zoom magnification of the electronic enlargement zoom.

For example, when reduction of ¾ magnification is carried out in the solid-state imaging device 10 with the horizontal cycle of 1,000 pixels, the electric charge having no periodicity in terms of the pixel unit is read out under a intermittent state from the pixel part 11. Specifically, the electric charge is read out from the pixel part 11 by repeating the order of 1,000 valid pixels, 1,000 invalid pixels, and 1,000×2 valid pixels.

As shown in FIG. 8, the horizontal blanking period of the horizontal synchronizing signal HD4 outputted from the processing unit for picture signal 24 at this time is separated into $\tau 4$ and ($\tau 4 \times 2+1,000$ pixels), thus becoming unstable. This instability, i.e. the fluctuation of the horizontal blanking period, differs in accordance with the zoom magnifications. In the embodiment, the output cycle of the digital picture signal (referred to as an output picture signal) outputted from the processing unit for picture signal 24 is set as 4/3 times of the initial output cycle, i.e. 1,000×4/3=1,333 pixels, thereby, 1,333 valid pixels are continued three times equally. As a result, the horizontal synchronizing signal HD5 becomes to have a uniform periodicity without having the intermittence as shown in FIG. 8.

When the zoom magnification is changed, the intermittence cycle of the lines in the solid-state image sensor 10 is altered. In the followings, explanation is given, as an example, to the case where the zoom magnification is changed from 4/3 to 4/5 reduction. In this case, the line intermittence cycle becomes (4/5)×(4/3)≈1.06. As clear from the result of calculation, 1−(1/1.06)≈0.06, the line intermittence cycle of 1.06 line means that about six lines among one-hundred lines becomes invalid lines. That is, when the zoom magnification is set as 4/3, after fixing the output cycle of the output picture signal (specifically, its horizontal synchronizing signal); calculating the relative magnification for changing the zoom magnification from 4/3 to 4/5; and setting the calculated relative magnification as the line intermittence cycle of the solid-state imaging device 10, it becomes possible to make the output cycle of the output picture signal always constant regardless of the magnification.

In the followings, an expression is provided to show the relations between the action of the solid-state imaging device 10, the action of the processing unit for picture signal 24, and the horizontal blanking period. When the zoom magnification by the processing unit for picture signal 24 is A/B, it is possible to supply periodicity to the output picture signal through multiplying the output cycle of the output picture signal by B/A. By setting the zoom magnification that can be processed to be 1 or less, the output cycle of the output picture signal becomes adjustable based on changes in the horizontal blanking period of the output picture signal.

Next, the zoom magnification is changed to be C/D. For making the output cycle of the output picture signal to be fixed in this case, the intermittence cycle of the lines outputted from the solid-state imaging device 10 is set as (C/D)×(A/B), while keeping the output cycle of the output picture signal of B/A times.

According to the embodiment as described above, it is possible to supply a uniform periodicity without intermittence to the synchronizing signal of the output picture signal regardless of the zoom magnifications, through simultaneously performing the vertical-line readout control of the solid-state imaging device and the interpolation control of the processing unit for picture signal, and adjusting the length of the horizontal blanking period of the output picture signal. As a result, interface between the output picture signal and the circuit or the device to be connected thereto becomes easy, thereby allowing simplification of the interface structure.

The present invention has been described in detail by referring to the most preferred embodiments. However, various combinations and modifications of the components are possible without departing from the spirit and the broad scope of the appended claims.

What is claimed is:

1. A signal processing circuit for signal-processing an analog picture signal outputted from a solid-state imaging device that comprises: a pixel part arranged two-dimensionally; an electronic shutter shift register that supplies an electronic shutter shift pulse to a pixel part for resetting an electric charge of said pixel part; and a readout shift register that supplies a vertical readout shift pulse to said pixel part for reading out said electric charge of said pixel part in order, said signal processing unit comprising:

a drive unit, an A/D converter, a processing unit for picture signal, and a control unit, wherein said drive unit supplies each of said shift pulses separately to said electronic shutter shift register and said readout shift register, said A/D converter converts said analog picture signal outputted from said solid-state imaging device to a digital picture signal, said processing unit for picture signal designates a control start position of said digital picture signal outputted from said A/D converter and performs interpolation processing thereon along a horizontal direction and a vertical direction, said control unit controls said drive unit and said processing unit for picture signal, said drive unit extends a horizontal blanking period of said solid-state imaging device to be longer than a valid period during one line of said analog picture signal, and said processing unit for picture signal performs vertical-line interpolation processing to extend a part of picture area of said digital picture signal.

2. The signal processing circuit according to claim 1, wherein:

said drive unit controls said vertical-line readout of said solid-state imaging device in accordance with a zoom magnification; and said processing unit for picture signal adjusts said horizontal blanking period of said digital picture signal outputted from said processing unit for picture signal such that periodicity of a synchronizing signal in said digital picture signal outputted from said processing unit for picture signal becomes constant regardless of said zoom magnification.

3. A solid-state imaging device, comprising a solid-state imaging device and signal processing circuit, wherein:

said solid-state imaging device comprises:

a pixel part arranged two-dimensionally, an electronic shutter shift register that supplies an electronic shutter shift pulse to a pixel part to reset an electric charge of said pixel part, and a readout shift register that supplies a vertical readout shift pulse to said pixel part to read out said electric charge of said pixel part in order; and said signal processing unit comprises:

a drive unit, an A/D converter, a processing unit for picture signal, and control unit, wherein:

said drive unit supplies each of said shift pulses separately to said electronic shutter shift register and said readout shift register;

said A/D converter converts said analog picture signal outputted from said solid-state imaging device to a digital picture signal;

said processing unit for picture signal designates a control start position of said digital picture signal outputted from said A/D converter and performs interpolation processing thereon along a vertical direction;

said control unit controls said drive unit and said processing unit for picture signal;

said drive unit extends a horizontal blanking period of said solid-state imaging device to be longer than a valid period for one line of said analog picture signal;

said electronic shutter shift register, as said electronic shutter shift pulse, generates the one including a high-rate transfer pulse that is shorter than a normal one contained at least in a part of period during one pulse-cycle and supplies said pulse to said pixel part;

said readout shift register, as said vertical readout shift pulse, generates a pulse having a high-rate transfer pulse that is shorter than a normal one contained at least in a part of period of one pulse-cycle and supplies said pulse to said pixel part;

said drive unit sets continuous two frame periods of an electronic shutter frame period and a readout frame period as one cycle, and supplies said electronic shutter shift pulse to said electronic shutter shift register in said electronic shutter frame period, while supplying said vertical readout shift pulse to said readout shift register in said readout frame period, and said processing unit for picture signal performs interpolation processing on said digital picture signal in the same one period as said one period of said drive unit for extending a part of picture area of said digital picture signal.

4. The solid-state imaging device according to claim 3, wherein;

said drive unit controls said vertical-line readout of said solid-state imaging device in accordance with a zoom magnification; and said processing unit for picture signal adjusts said horizontal blanking period of said digital picture signal outputted from said processing unit for picture signal outputted from said processing unit for picture signal such that periodicity of a synchronizing signal of said digital picture signal outputted from said processing unit for picture signal becomes a constant regardless of said zoom magnification.

5. The solid-state imaging device according to claim 3, wherein said pixel part is consisted of a MOS-type sensor.

* * * * *